P. T. JACKSON AND G. F. PICKETT.
MECHANICAL TOY.
APPLICATION FILED MAR. 11, 1922.

1,427,295.

Patented Aug. 29, 1922.

Percy Thomas Jackson  
George Frederick Pickett  Inventors
by Seward Davis
Their Attorney

UNITED STATES PATENT OFFICE.

PERCY THOMAS JACKSON AND GEORGE FREDERICK PICKETT, OF BEXLEY HEATH, ENGLAND.

MECHANICAL TOY.

1,427,295.  Specification of Letters Patent.  Patented Aug. 29, 1922.

Application filed March 11, 1922. Serial No. 543,070.

*To all whom it may concern:*

Be it known that we, PERCY THOMAS JACKSON and GEORGE FREDERICK PICKETT, subjects of the King of Great Britain and Ireland, residing, respectively, at 12 Dallin Road and 7 Rowan Road, both of Bexley Heath, in the county of Kent, England, have invented new and useful Improvements in and Relating to Mechanical Toys, of which the following is a specification.

This invention relates to mechanical toys of the kind in which an articulated figure is fitted to a sound reproducing instrument and mechanically actuated thereby.

Hitherto, motion has been communicated to the articulated figure by a device mounted upon the spindle of the turn table of a gramophone but no attempt has been made to utilize the sound vibrations of the instrument to modify the movements of the articulated figure.

The object of the present invention is to utilize the sound vibrations as well as the motion of the instrument to actuate the figure.

This invention consists of a mechanical toy which comprises in combination a platform adapted to be secured to a sound reproducing instrument, a support on said platform, a carrier mounted in said support, an articulated figure on said carrier, and a rotating member on said carrier normally engaging a rotating part of said instrument for the purpose of transmitting the motion of said instrument to said figure to cause it to move.

Further features of the invention will transpire hereinafter with reference to the accompanying drawings in which:—

Figure 1:
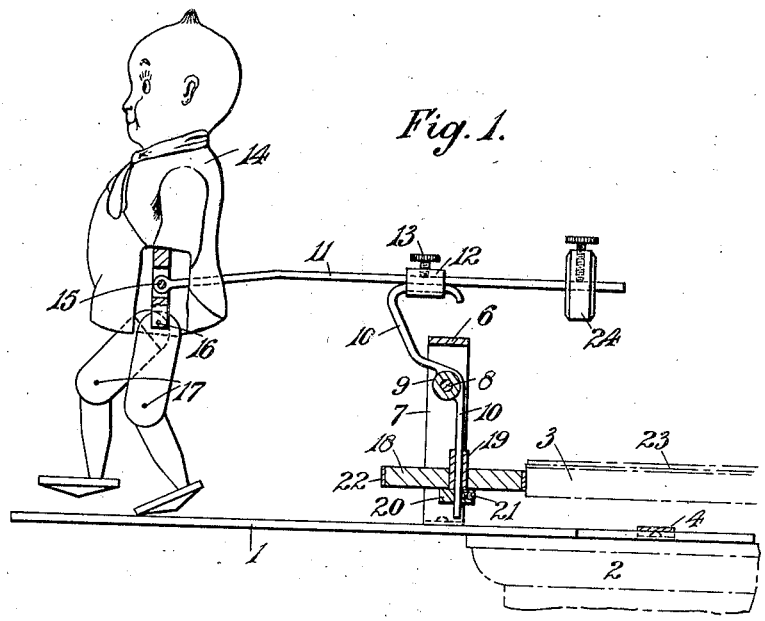
Figure 1 is a side elevation partly in section.
Figure 2:
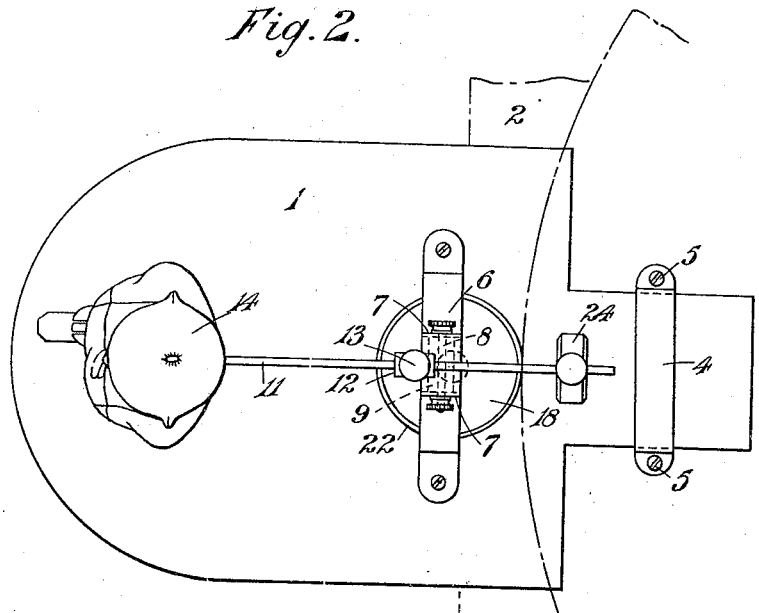
Figure 2 is a plan view of Figure 1.

Referring to the drawings, the platform 1 of suitable size and shape is secured to the body 2 of a gramophone at a point beneath the rotating table or record support 3 by means of a strap 4 and screws 5. Secured to the platform is a bridge type fitting or support 6 between the upright members 7 on which is mounted a pivot 8 carrying a loose sleeve 9 to which is connected the carrier comprising a bent substantially vertical portion 10 and a substantially horizontal portion 11 adjustably connected by the sleeve 12 and set screw 13. A figure 14 is supported upon a transverse rod or bar 15 by the carrier 11 so as to permit of a limited amount of transverse movement. The lower limbs of the figure are articulated at 16 and 17.

At the lower end of the vertical carrier member 10 a wheel 18 is mounted on a bush 19 supported by a collar 20 held in position by a set screw 21. Wheel 18 is preferably but not necessarily shod with a rubber band or tyre 22 and the parts are so proportioned and positioned that the wheel or tyre normally engages the rotating table 3. Wheel 18 as shown is eccentrically mounted to a slight degree upon carrier 10 so that as the wheel rotates in contact with table 3 a slight rocking movement is imparted to the carrier about the pivot 8.

The operation of the device is as follows. The rotating table 3 carrying the record disc 23 being in contact with wheel 18 rotates the latter and rocks the carrier slightly. The vibrations set up in the gramophone due to sound are communicated through the platform and the bridge type support to the carrier, with the result that the figure moves about slightly what time the articulated limbs are in motion producing a droll effect, as if the figure were dancing. The effect produced varies with the distance between the pivot 8 and the periphery of the table 3 and this distance can be varied by moving the platform towards or away from the table 3.

In order to further modify the effect produced or to compensate for additional weight in the figure, a balance or counter weight 24 is adjustably mounted on the carrier member 11.

The peripheral contour of wheel 18 may be cylindrical that is to say regular, or it may be irregular so as to impart different kinds of movement to the carrier. Two or more figures on carriers 11 may be supported in the sleeve 12 on the carrier member 10. The collar 20 which supports the wheel 18 is adjustable so as to bring the wheel into alignment with the disc table 3 in different types of instrument.

The movements of the figure are rendered uncertain on account of the inertia of the figure and carrier which causes the wheel 18 to have intermittent contact only with the periphery of the rotating table 3. This uncertainty and grotesqueness of movement are further exaggerated in cases where irregularities of the record table or driven wheel are relied upon to effect the movement of the figure. When however the parts are suitably modified for instance when a relatively true circular driving wheel is concentrically mounted on the carrier and the connexions sufficiently sensitive, the movements of the figure are responsive only to the sound or vibrations set up in the gramophone or other sound reproducing instrument.

We claim:—

1. A mechanical toy comprising in combination a platform, means for securing said platform to a sound reproducing instrument, a support carried by said platform, a tilting carrier pivotally mounted in said support, an articulated figure pivotally supported on said carrier, and a carrier-actuating rotating member mounted on said carrier ad adapted to swing successively into and out of engagement with a rotating part of said instrument other than the record and transmit motion to said carrier and figure.

2. A mechanical toy comprising in combination a platform, means for securing said platform to a sound reproducing instrument, a support secured to said platform, a carrier pivotally mounted in said support, an articulated figure on said carrier, and a rotating member mounted on said carrier adapted intermittently to engage the periphery of a rotating part of said instrument below the level of the surface of the record disc and rock said carrier and figure.

3. A mechanical toy comprising in combination a platform, means for detachably securing said platform to a sound reproducing instrument, a support secured to said platform, a carrier pivotally mounted in said support, an articulated figure pivotally mounted in said carrier and a rotating member mounted on said carrier adapted peripherally to engage a rotating part of said instrument other than the record disc and rock the said carrier and figure.

4. A mechanical toy comprising in combination with a sound reproducing instrument a platform, means for detachably securing said platform to said instrument, a support secured to said platform, a carrier detachably mounted in said support, an articulated figure pivotally mounted in said carrier, a rotating record holder forming part of the said instrument, and a rotating member eccentrically mounted on the said carrier substantially in the plane of the rotating record holder and adapted intermittently to contact its periphery with the periphery of the said rotating record holder and rock the said carrier and figure.

5. The combination with a sound reproducing instrument comprising a rotating record holder, of a mechanical toy which comprises a platform, means for adjustably securing said platform to the said instrument, a support secured to said platform, a carrier pivotally mounted in said support, an articulated figure pivotally mounted in said carrier, a rotating member eccentrically mounted on said carrier in intermittent frictional contact with the periphery of the said record holder and adapted to rock the said carrier and cause the said figure to move, and a counterweight adjustably mounted on the said carrier adapted to modify the movement of the said figure.

6. A mechanical toy comprising in combination a platform, means for securing said platform to a sound reproducing instrument, a bridge type support carried by said platform, a counter-weighted carrier mounted in said support, an articulated figure on said carrier, said parts being adapted to form a transmitting medium for sound vibration from the said instrument to the said figure, and a horizontally rotating member mounted on said carrier, said member being normally adapted to engage a rotating part of said instrument other than the record disc and transmit motion to said carrier and figure and to be reacted upon by the movements of said carrier and figure, whereby the engagement between the rotating parts is interrupted intermittently.

7. A mechanical toy comprising in combination a platform, means for securing said platform to a sound reproducing instrument, a bridge type support secured to said platform, a balanced carrier pivotally mounted in said support, an articulated figure on said carrier, said parts being adapted to form a transmitting medium for sound vibrations from the said instrument to the said figure, and a rotating horizontal member mounted on said carrier adapted to engage a rotating part of said instrument below the level of the record disc and rock the said carrier and figure, the rocking of the carrier serving to interrupt the engagement between the rotating parts.

8. A mechanical toy comprising in combination a platform, means for detachably securing said platform to a sound reproducing instrument, a bridge type support secured to said platform, a carrier pivotally mounted in said support, an articulated figure pivotally mounted in said carrier, said parts being adapted to form a transmitting medium for sound vibrations from the said instrument to the said figure, and a rotating horizontal member mounted on said carrier adapted intermittently to engage its periphery with the periphery of a rotating part of said instrument below the level of the record disc and rock the said carrier and figure.

9. A mechanical toy comprising in combination with a sound reproducing instrument a platform, means for detachably securing said platform to said instrument, a bridge type support secured to said platform, a carrier detachably mounted in said support, an articulated figure pivotally mounted in said carrier, said parts being adapted to form a transmitting medium for sound vibrations from the said instrument to the said figure, a rotating record holder forming part of said instrument and a rotating member eccentrically mounted on said carrier in the plane of said record holder adapted to engage the periphery of the said record holder intermittently and rock the said carrier and figure.

10. The combination with a sound reproducing instrument comprising a rotating record holder, of a mechanical toy which comprises a platform, means for adjustably securing said platform to the said instrument, a bridge type support secured to said platform, a carrier detachably mounted in said support, an articulated figure pivotally mounted in said carrier, said parts being adapted to form a transmitting medium for sound vibrations from the said instrument to the said figure, a rotating member eccentrically mounted on said carrier in intermittent frictional contact with the periphery of the said holder and adapted to rock the said carrier and figure, and a counterweight adjustably mounted on the said carrier adapted to modify the movement of the said figure, substantially as described.

PERCY THOMAS JACKSON.
GEORGE FREDERICK PICKETT.